United States Patent
Yamanaka et al.

(10) Patent No.: US 8,955,410 B2
(45) Date of Patent: Feb. 17, 2015

(54) BICYCLE CRANK ASSEMBLY

(75) Inventors: Masahiro Yamanaka, Osaka (JP); Eigo Kuroiwa, Osaka (JP); Tetsu Nonoshita, Osaka (JP)

(73) Assignee: Shimano Inc., Osaka (JP)

( * ) Notice: Subject to any disclaimer, the term of this patent is extended or adjusted under 35 U.S.C. 154(b) by 70 days.

(21) Appl. No.: 13/539,869

(22) Filed: Jul. 2, 2012

(65) Prior Publication Data

US 2013/0091981 A1    Apr. 18, 2013

(51) Int. Cl.
*B62M 3/00*    (2006.01)

(52) U.S. Cl.
CPC *B62M 3/00* (2013.01); *B62M 3/003* (2013.01)
USPC ........................................ 74/594.1; 74/594.2

(58) Field of Classification Search
CPC ....................................................... B62M 3/00
USPC .................. 74/594.1–594.6; 280/259
See application file for complete search history.

(56) References Cited

U.S. PATENT DOCUMENTS

| | | | | |
|---|---|---|---|---|
| 4,300,411 | A * | 11/1981 | Segawa | 74/594.2 |
| 4,318,310 | A * | 3/1982 | Segawa | 74/594.2 |
| 6,059,171 | A * | 5/2000 | Yamanaka et al. | 228/164 |
| 6,899,402 | B2 * | 5/2005 | Chiang et al. | 301/124.2 |
| 7,334,500 | B2 * | 2/2008 | Tseng | 74/594.1 |
| 7,527,277 | B2 * | 5/2009 | Nonoshita et al. | 280/259 |
| 8,438,947 | B2 * | 5/2013 | Yamanaka et al. | 74/594.1 |
| 2004/0162172 | A1 * | 8/2004 | Yamanaka et al. | 474/160 |
| 2004/0200314 | A1 * | 10/2004 | Hermansen et al. | 74/594.1 |
| 2007/0137425 | A1 * | 6/2007 | Dal Pra et al. | 74/594.1 |
| 2007/0241530 | A1 * | 10/2007 | Nonoshita et al. | 280/259 |
| 2008/0245180 | A1 * | 10/2008 | Huang | 74/594.1 |
| 2014/0047947 | A1 * | 2/2014 | Nonoshita et al. | 74/594.1 |
| 2014/0144285 | A1 * | 5/2014 | Yamanaka et al. | 74/594.1 |
| 2014/0182413 | A1 * | 7/2014 | Yamanaka et al. | 74/594.1 |

FOREIGN PATENT DOCUMENTS

| | | | | |
|---|---|---|---|---|
| EP | 1 120 336 A2 * | 8/2001 | | B62M 3/00 |
| EP | 1449760 A2 | 8/2004 | | |

* cited by examiner

*Primary Examiner* — Vinh Luong
(74) *Attorney, Agent, or Firm* — Global IP Counselors (57) ABSTRACT

A bicycle crank assembly is basically provided with a crank axle, a first outer shell member, a second outer shell member, a first crank axle supporting member and a second crank axle supporting member. The crank axle has an end portion with an external mounting surface and an internal mounting surface. The first and second outer shell members are arranged relative to each other with a space being formed between the first and second outer shell members. The first crank axle supporting member is disposed on the first outer shell member and supports the external mounting surface of the crank axle. The second crank axle supporting member is disposed on the first outer shell member and supports the internal mounting surface of the crank axle.

24 Claims, 8 Drawing Sheets

BICYCLE CRANK ASSEMBLY

CROSS-REFERENCE TO RELATED APPLICATIONS

This application claims priority under 35 U.S.C. §119 to Taiwanese Patent Application No. 100137013, filed Oct. 12, 2011. The entire disclosure of Taiwanese Patent Application No. 100137013 is hereby incorporated herein by reference.

BACKGROUND

1. Field of the Invention

This invention generally relates to a bicycle crank assembly. More specifically, the present invention relates to a bicycle crank assembly in which a crank axle fixed to a crank arm.

2. Background Information

Conventional bicycle crank assemblies are known in which a crank axle is fixed to a crank arm (e.g., European Laid-Open Patent Application No. 1 449 760). The conventional crank assembly has a crank axle and a one-piece crank arm in which the crank axle is fixed. A sprocket is detachably fixed to the crank arm. The crank axle is fixed to the crank arm by, for example, crimping.

SUMMARY

It has been discovered that using a crank arm structure having two or more pieces can reduce the weight further in comparison with the conventional one-piece crank arm. However, when a crank axle is fixed to a crank arm having two or more pieces, it is necessary to ensure that a portion of the crank arm where the crank axle is fixed has sufficient rigidity. One object presented in the present disclosure is to reduce the overall weight of a crank assembly in which a crank axle is fixed. Another object presented in the present disclosure is to keep sufficient rigidity of a portion of the crank assembly where the crank axle is fixed.

In view of the state of the known technology, a bicycle crank assembly is provided that basically comprises a crank axle, a first outer shell member, a second outer shell member, a first crank axle supporting member and a second crank axle supporting member. The crank axle has an end portion with an external mounting surface and an internal mounting surface. The first and second outer shell members are arranged relative to each other with a space being formed between the first and second outer shell members. The first crank axle supporting member is disposed on the first outer shell member and supports the external mounting surface of the crank axle. The second crank axle is disposed on the second outer shell member and supports the internal mounting surface of the crank axle.

With this bicycle crank assembly, the first and second outer shell members are fixed to the crank axle by being fitted together with the crank axle, and the sufficient rigidity of the crank assembly can be obtained at the portions where the crank axle is fixed because the external and internal mounting surfaces of the crank axle are supported by the first and second crank axle supporting members respectively. Also, a space can be formed efficiently between the first outer shell member and the second outer shell member. As a result, the overall weight of the crank assembly can be easily reduced.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
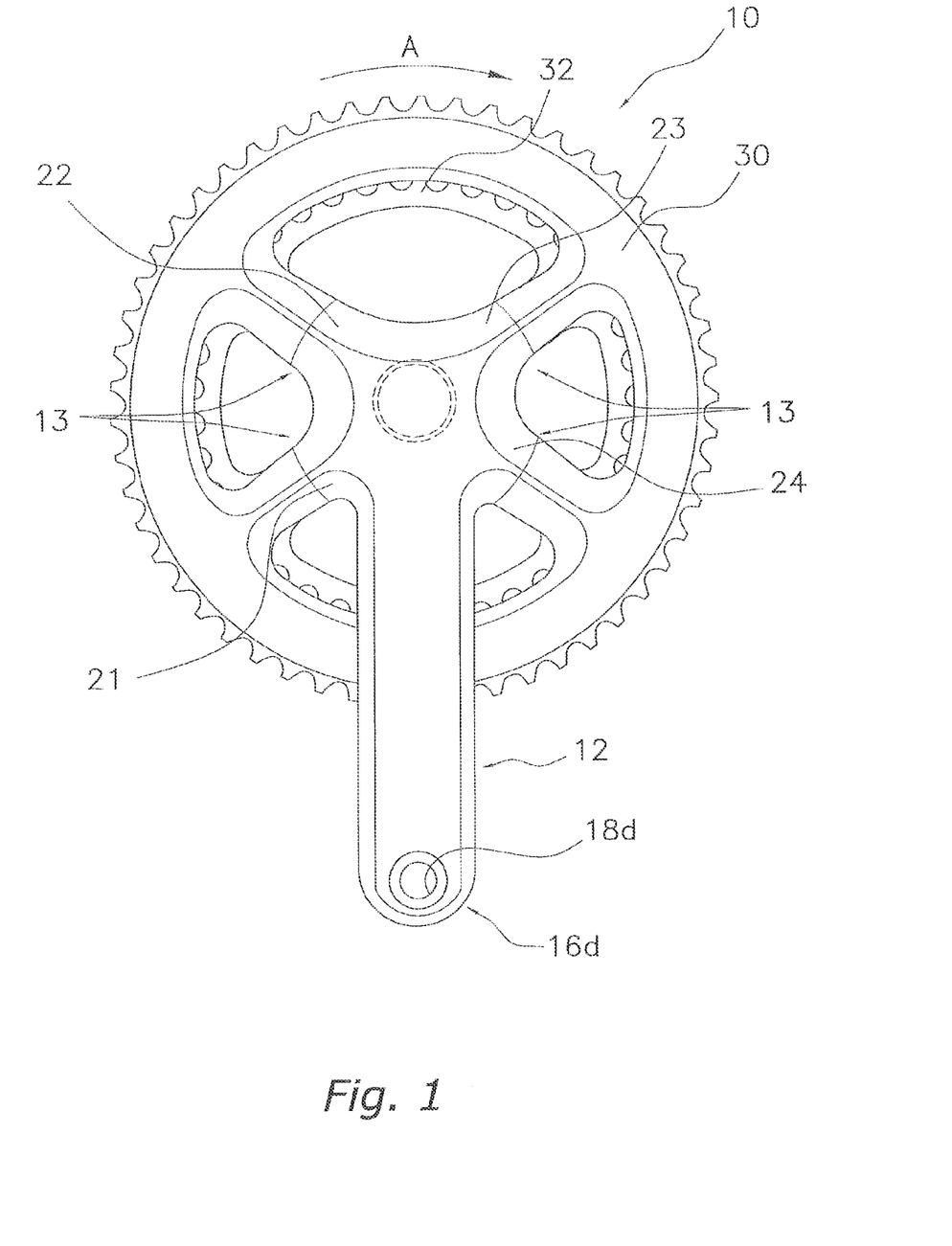
FIG. 1 is an outside elevational view of a right bicycle crank assembly in accordance with a first embodiment.
Figure 2:
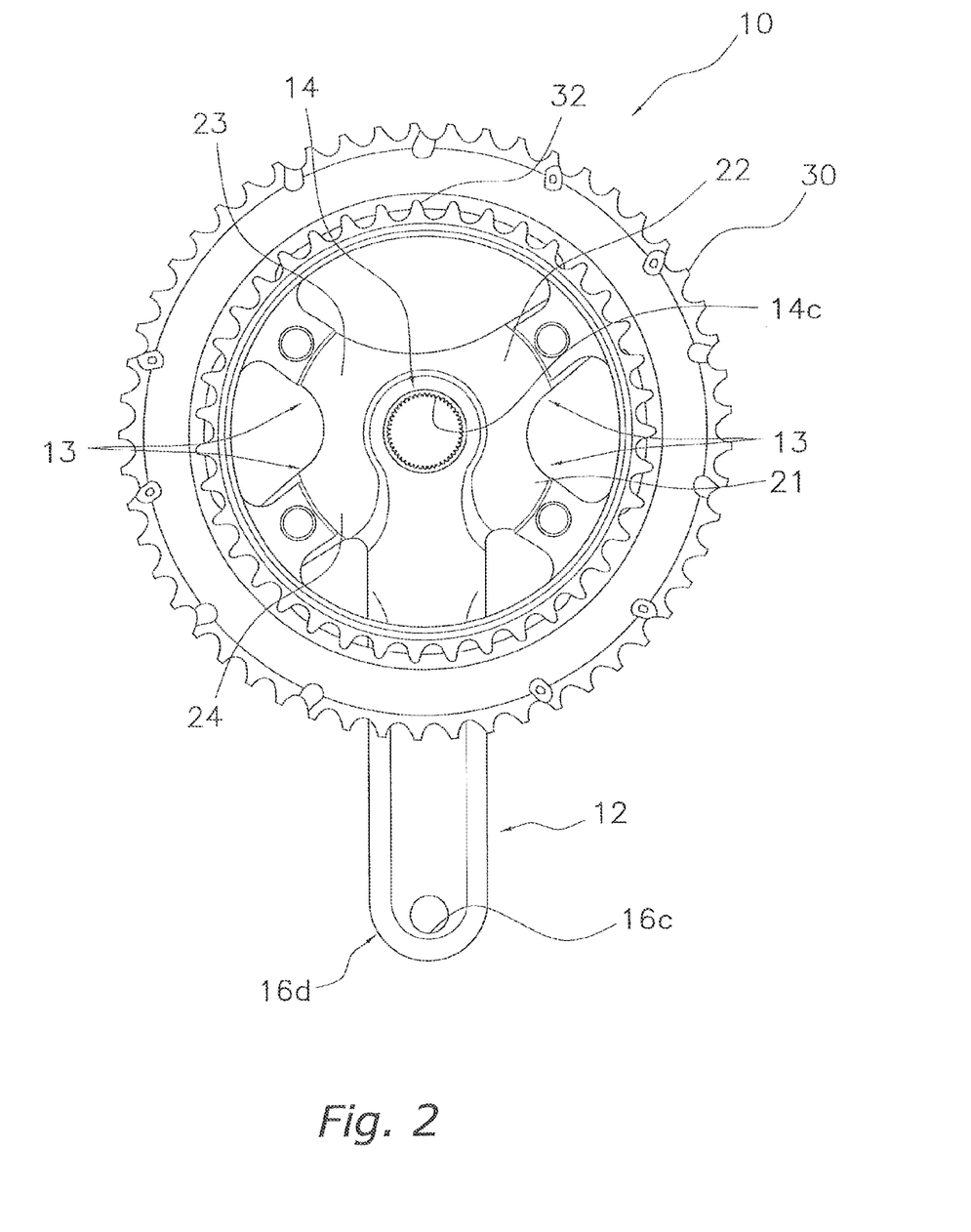
FIG. 2 is an inside elevational view of the bicycle crank assembly illustrated in FIG. 1.
Figure 3:
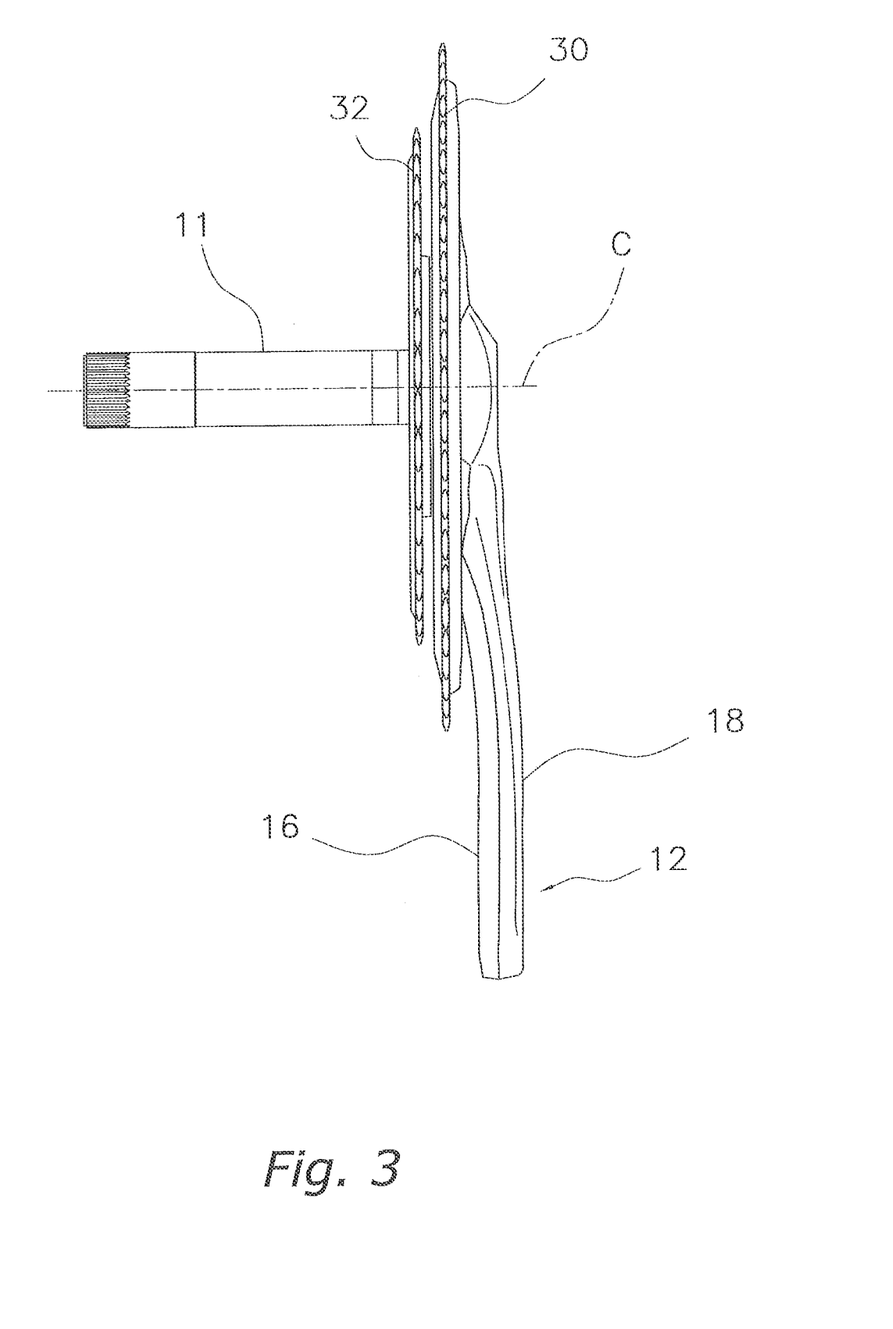
FIG. 3 is a left side elevational view of the bicycle crank assembly illustrated in FIG. 1.

Referring initially to FIGS. 1 to 4, a bicycle crank assembly 10 is illustrated in accordance with a first embodiment. The bicycle crank assembly 10 includes a hollow crank axle 11, a crank main body 12, a plurality of sprocket mounting portions 13, a first crank axle supporting member 14 and a second crank axle supporting member 15. The sprocket mounting portions 13 extend in a radial form from one end of the crank main body 12. FIGS. 1 to 3 show the crank assembly 10 with a first sprocket 30 and a second sprocket 32 attached. FIGS. 1 and 2 show the crank assembly 10 with the crank axle 11 and the second crank axle supporting member 15 removed.

The crank axle 11 is rotatably supported with a bearing in a bottom bracket hanger of a bicycle frame (not shown in drawings). The crank axle 11 has an external mounting surface 11a and an internal mounting surface 11b at one end portion of the crank axle 11. The external mounting surface 11a protrudes outward in a radial direction farther than an external surface of an intermediate portion of the crank axle 11. The external mounting surface 11a has a plurality of first splines 11c. The external mounting surface 11a preferably has projection 11d that prevents a first crank part 16 from axially outwardly moving relative to the crank axle 11 in an axial direction of the crank axle 11. The projection 11d is preferably a flange formed integrally around a circumference of the crank axle 11. The internal mounting surface 11b is a circular surface positioned farther inward in a radial direction toward a center axis C of the crank axle 11 than the external mounting surface 11a. The crank axle 11 is fixed to the crank main body 12. In the first embodiment, the crank axle 11 is fixed to the crank main body 12 in a press-fit manner (i.e., interference fit).

The crank main body 12 and the sprocket mounting portions 13 are preferably formed as a one-piece integral unit. The crank main body 12 and the sprocket mounting portions 13 are divided into the first crank part 16 and a second crank part 18. The first and second crank parts 16 and 18 are configured such that a space can be formed in between them. The first crank part 16 is an example of a first outer shell member. The second crank part 18 is an example of a second outer shell member.

The first and second crank parts 16 and 18 are made of, for example, an aluminum alloy or other metal. The first crank part 16 provides most of the rigidity of the crank main body 12 and the sprocket mounting portions 13. The second crank part 18 is mounted to the first crank part 16 so as to cover the first crank part 16. The second crank part 18 provides the remainder of the rigidity of the crank main body 12 and the sprocket mounting portions 13 and also serves an ornamental function. Thus, the first crank part 16 is preferably thicker than the second crank part 18. The first and second crank parts 16 and 18 are preferably fixed together with, for example, an adhesive.

Figure 4:
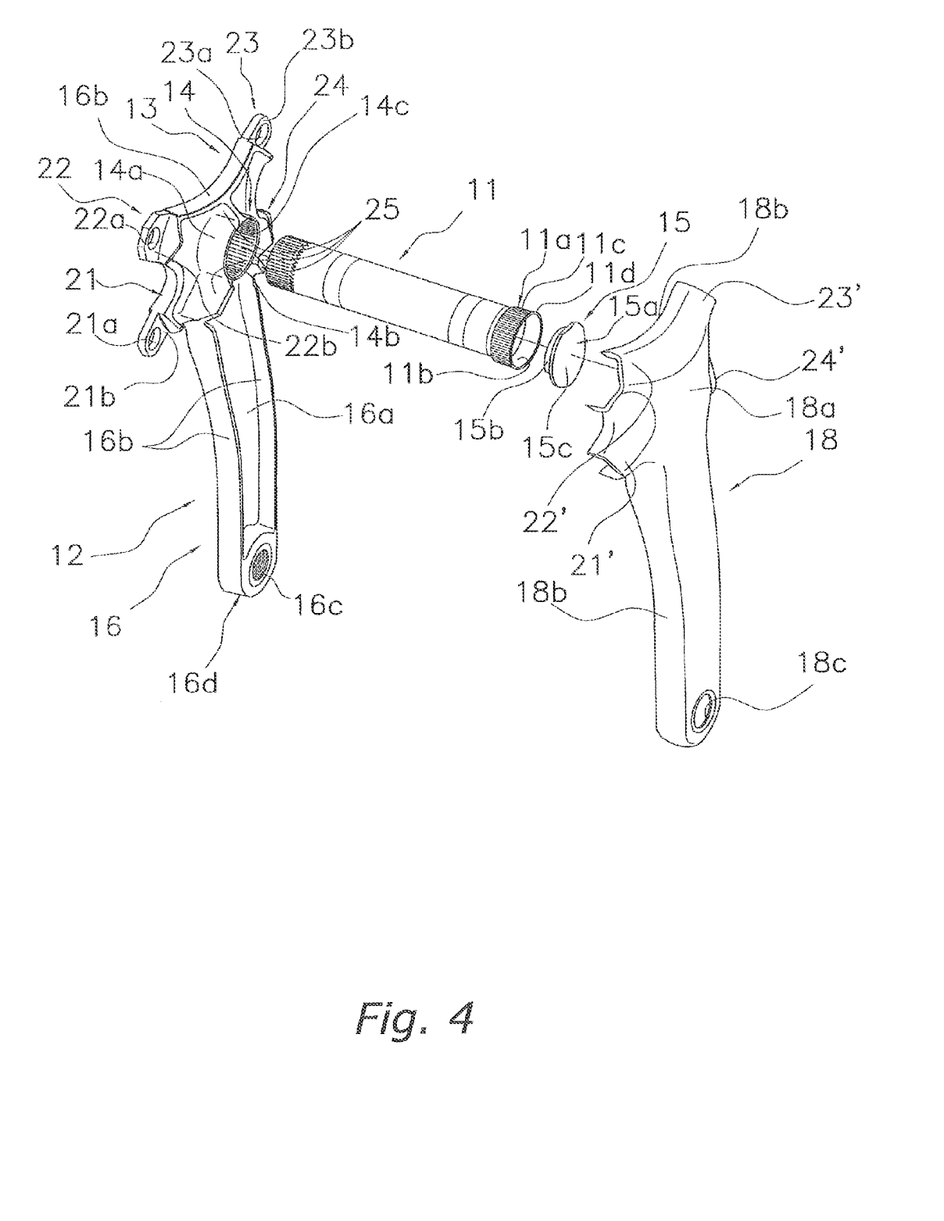
FIG. 4 is an exploded perspective view of the bicycle crank assembly illustrated in FIG. 1.

As shown in FIG. 4, the crank main body 12 is a hollow rod-like member that extends from the crank axle 11 in a radial direction. A pedal axle mounting portion 16d is provided on a tip end of the first crank part 16 of the crank main body 12. The pedal axle mounting portion 16d has a pedal axle mounting threaded hole 16c.

Figure 5:
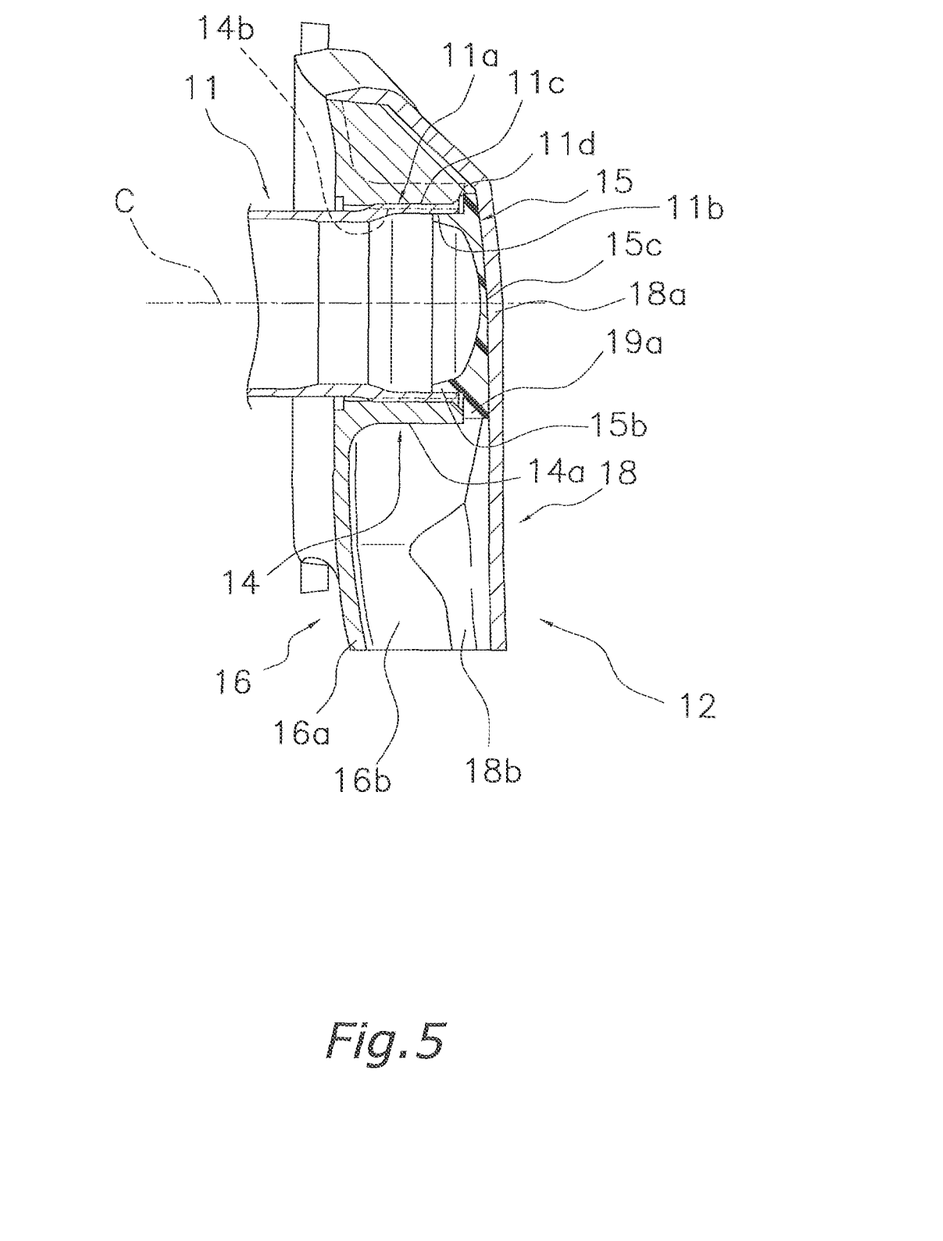
FIG. 5 is an enlarged cross sectional view of a portion of the bicycle crank assembly where the crank axle is fixed.

As shown in FIG. 5, the first crank axle supporting member 14 is arranged on a base end of the crank main body 12 of the first crank part 16. The first crank axle supporting member 14 engages with the external mounting surface 11a of the crank axle 11 to support the external mounting surface 11a. In the first embodiment, the first crank axle supporting member 14 is formed as a one-piece integral unit with the first crank part 16. The first crank axle support member 14 has a cylindrical portion 14a and a plurality of second splines 14b. The second splines 14b are formed on an internal circumferential surface of the cylindrical portion 14a. The second splines 14b are configured to engage with the first splines 11c of the external mounting surface 11a such that the first crank axle support member 14 and the crank axle 11 rotate as a unit. The cylindrical portion 14a is reinforced with a plurality of ribs 25 (see FIG. 4). The crank axle 11 is inserted into the cylindrical portion 14a from the end portion (left end portion in FIG. 4) on the opposite side of the external mounting surface 11a. The crank axle 11 is fixed to the first crank part 16 by being inserted into the cylindrical portion 14a in a press-fit manner so that the first splines 11c formed on the larger diameter external mounting surface 11a engage with the second splines 14b of the first crank axle supporting member 14 for fixing the crank axle 11 to the first crank part 16. Alternatively, it is also acceptable to fix the crank axle 11 to the first crank part 16 with an adhesive. In such a case, it is preferable to fit the first splines 11c of the crank axle 11 and the second splines 14b of the first crank support portion 14 together with a gap in-between instead of in a press-fit manner.

The second crank axle supporting member 15 is arranged on a base end of the crank main body 12 of the second crank part 18. The second crank axle supporting member 15 engages with the internal mounting surface 11b of the crank axle 11 to supports the internal mounting surface 11b. In the first embodiment, the second crank axle supporting member 15 is formed as a separate entity or member from the crank main body 12 of the second crank part 18. The second crank axle support member 15 includes a flange portion 15a and a cylindrical portion 15b. The flange portion 15a is fixed to the second crank part 18. The cylindrical portion 15b is formed as a one-piece integral unit with the flange portion 15a. The cylindrical portion 15b is configured to support the internal mounting surface 11b of the crank axle 11. An outer surface 15c of the flange portion 15a of the second crank axle support member 15 has a shape that fits with the contour of a second bottom portion 18a (explained later) of the second crank part 18. The outer surface 15c is configured to contact the second bottom portion 18a. In this embodiment, the outer surface 15c of the flange portion 15a is fixed to the second bottom surface 18a with an adhesive. The external surface of the cylindrical portion 15b is preferably fixed to the internal mounting surface 11b of the crank axle 11 with an adhesive. The second crank axle supporting member 15 is made of, for example, a polyamide resin or another synthetic resin. The second crank axle supporting member 15 functions to prevent the second crank part 18 from easily becoming indented by contacting the second bottom portion 18a of the second crank part 18 at the portion where the crank axle 11 is disposed on the second crank part 18.

Concerning the crank main body 12, the first crank part 16 has a first bottom portion 16a and a first wall portion 16b. The first bottom portion 16a is thin-walled and extends in a radial direction of the crank axle 11. The first wall portion 16b is formed on an outer perimeter portion of the first bottom portion 16a.

Concerning the crank main body 12, the second crank part 18 has a second bottom portion 18a and a second wall portion 18b. The second bottom portion 18a is arranged to face the first bottom portion 16a of the first crank part 16. The second wall portion 18b is formed on an outer perimeter portion of the second bottom portion 18a. As a result, a space is formed between the first and second crank parts 16 and 18. A through hole 18c is formed in a portion of the second crank part 18 that faces the pedal mounting threaded hole 16c. The through hole 18c is configured such that a pedal axle can be passed therethrough. A portion of the second crank part 18 that faces the first crank axle supporting member 14 is configured to cover the first crank axle supporting member 14. In this way, the first crank axle supporting member 14 is not exposed so as to be visible from the outside. The second wall portion 18b is configured such that the second wall portion 18b closely contacts (i.e., mates) with the outside surface of the first wall portion 16b. The second wall portion 18b is joined to the first wall portion 16b with, for example, an adhesive.

The sprocket mounting portions 13 extend from the crank main body 12 of the first crank part 16. The sprocket mounting portions 13 has first to fourth sprocket mounting arms 21 to 24, respectively. The first sprocket mounting arm 21 has a first sprocket mounting hole 21a. The second sprocket mounting arm 22 has a second sprocket mounting hole 22a. The third sprocket mounting arm 23 has a third sprocket mounting hole 23a. The fourth sprocket mounting arm 24 has a fourth sprocket mounting hole 24a. The first to fourth sprocket mounting holes 21a to 24a are formed in the vicinity of the tip end portions of the first to fourth sprocket mounting arms 21 to 24. A portion of each of the first to fourth sprocket mounting arms 21a to 24a surrounding the first to fourth sprocket mounting holes 21a to 24a is machined on both sides so as to be thinner than other portions. The first sprocket 30 is fixed to first to fourth outer surfaces 21b to 24b and the second sprocket 32 is fixed to inner surfaces on the opposite side as the first sprocket 30 with shared fastening bolts, which are not shown in the drawings.

The first, second, third and fourth sprocket mounting arms 21, 22, 23 and 24 are arranged sequential order as one moves from the crank main body 12 in the rotational direction (the clockwise rotational direction indicated by the arrow A in FIG. 1) of the bicycle crank assembly 10 to drive the bicycle, the mounting arms. The second crank part 18 also has first to fourth sprocket mounting arms 21', 22', 23', and 24' that extend from the crank main body 12. The first to fourth sprocket mounting arms 21' to 24' of the second crank part 18 are provided such that they cover portions other than areas surrounding the first to fourth sprocket mounting holes 21a to 24a. Thus, in this embodiment, four of the sprocket mounting portions 13 are formed by the first to fourth sprocket mounting arms portions 21, 22, 23 and 24 of the first crank part 16 and the first to fourth sprocket mounting arms 21', 22', 23' and 24' of the second crank part 18. In this embodiment, the circumferential spacing between the first sprocket mounting arms 21 and 21' and the second sprocket mounting arms 22 and 22' and the circumferential spacing between the third sprocket mounting arms 23 and 23' and the fourth sprocket mounting arms 24 and 24' are equal. Meanwhile, the circumferential spacing between the second sprocket mounting arms 22 and 22' and the third sprocket mounting arms 23 and 23' is larger than the circumferential spacing between the first sprocket mounting arms 21 and 21' and the second sprocket mounting arms 22 and 22'. Furthermore, the circumferential spacing between the second sprocket mounting arms 22 and 22' and the third sprocket mounting arms 23 and 23' and the circumferential spacing between the fourth sprocket mounting arms 24 and 24' and the first sprocket mounting arms 21 and 21' are equal.

In the bicycle crank assembly 10 according to this embodiment, the spacing between the sprocket mounting arms is narrower between the first sprocket mounting arms 21 and 21' and the second sprocket mounting arms 22 and 22' and between the third sprocket mounting arms 23 and 23' and the fourth sprocket mounting arms 24 and 24,' which are places where large loads occur during pedaling. In this way, the rigidity of the crank assembly 10 is improved in an effective manner. Also, the rigidities of the second sprocket mounting arms 22 and 22' and the fourth sprocket mounting arms 24 and 24' are higher than the rigidities of the first sprocket mounting arms 21 and 21' and the third sprocket mounting arms 23 and 23'. The first sprocket mounting arms 21 and 21' and the third sprocket mounting arms 23 and 23' require smaller rigidities. The structures of the first sprocket mounting arms 21 and 21' and the third sprocket mounting arms 23 and 23' can be focused on weight-saving more.

The first crank part 16 constitutes a first outer shell member that is fixed to the external mounting surface 11a of the crank axle 11 through the first crank axle supporting member 14. The second crank part 18 constitutes a second outer shell member that is fixed to the internal mounting surface 11b through the second crank axle supporting member 15. As a result, the first and second crank parts 16 and 18 are supported on both the external mounting surface 11a and the internal mounting surface 11b of the crankshaft 11. Thus, the crank axle fixing portion of the crank assembly 10 can be provided with a high rigidity. The crank main body 12 and the sprocket mounting portions 13 divided into the first and second crank parts 16 and 18, and a space can be formed between the first and second crank parts 16 and 18. As a result, the overall weight of the crank assembly 10 can be reduced.

Figure 6:
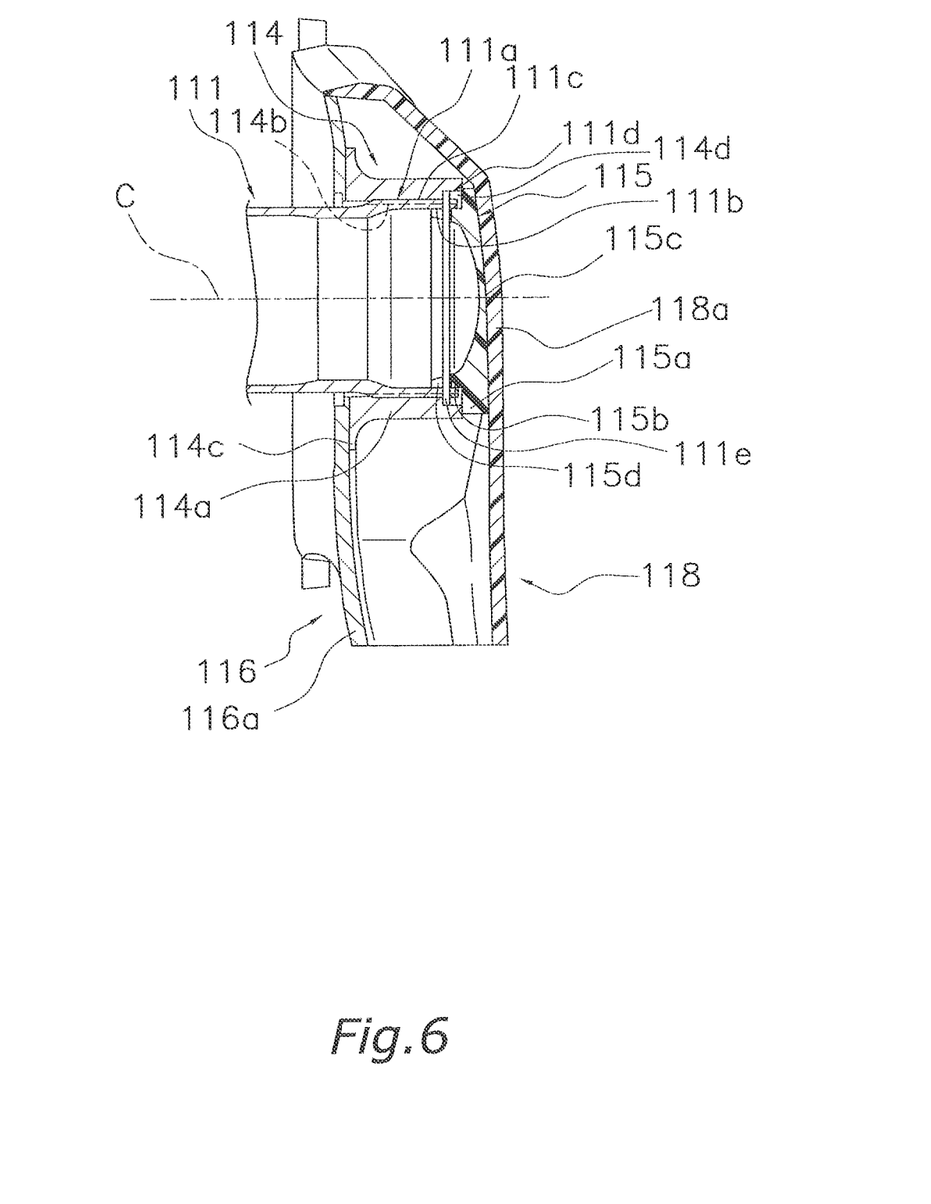
FIG. 6 is an enlarged cross sectional view corresponding to FIG. 5, of a portion of the bicycle crank assembly where the crank axle is fixed in accordance with a second embodiment.

Referring now to FIG. 6, a bicycle crank assembly is illustrated in accordance with a second embodiment, which comprises a hollow crank axle 111, a first crank axle supporting member 114, a second crank axle supporting member 115, a first crank part 116 and a second crank part 118. Also the first and second crank parts 116 and 118 are joined together to form a crank main body and a plurality of sprocket mounting portions having the same configuration as in the first embodiment. The bicycle crank assembly of this second embodiment is identical to the bicycle crank assembly 10 of the first embodiment, except as explained below. While in the first embodiment the first crank axle supporting member 14 and the first crank part 16 are formed as a one-piece integral unit, the first crank axle supporting member 114 and the first crank part 116 are formed as separate pieces in the second embodiment. In particular, the first crank axle supporting member 114 has a cylindrical portion 114a, a plurality of second splines 114b and a flange portion 114c. The flange portion 114c is fixed to the first crank part 116. The cylindrical portion 114a is formed as a one-piece integral unit with the flange portion 114c. The hollow crank axle 111 has a plurality of first splines 111c. The second splines 114b are formed on an internal circumferential surface of the cylindrical portion 114a. The second splines 114b engage with the first splines 111c that are formed on the external mounting surface 111a of the crank axle 111. An internal circumferential surface of the cylindrical portion 114a is fixed onto the external mounting surface 111a of the crank axle 111 by, for example, in a press-fit manner The flange portion 114c is fixed to a first bottom portion 116a of the first crank part 116 with, for example, and adhesive.

Also, the second crank part 118 is not made of an aluminum alloy or other metal but is made of a fiber reinforced resin that is reinforced with a carbon fiber or glass fiber.

In the second embodiment, a projection 111d is formed as a pin 111e that passes through the crank axle 111. The projection 111d prevents the first crank part 116 from axially outwardly moving relative to the crank axle 111 in an axial direction of the crank axle 111. The pin 111e is arranged to pass through the crank axle 111 in a radial direction. The pin 111e is inserted through first slits 114d, which are provided in an end portion the cylindrical portion 114a of the first crank axle supporting member 114 at two locations along a circumferential direction.

Similarly to the first embodiment, the second crank axle supporting member 115 is fixed to the bottom portion 118a of the second crank part 118 with an adhesive. The pin 111e is inserted through second slits 115d, which are provided in the cylindrical portion 115b of the second crank axle supporting member 115 at two locations along a circumferential direction. Otherwise, the constituent features are the same as in the first embodiment.

Figure 7:
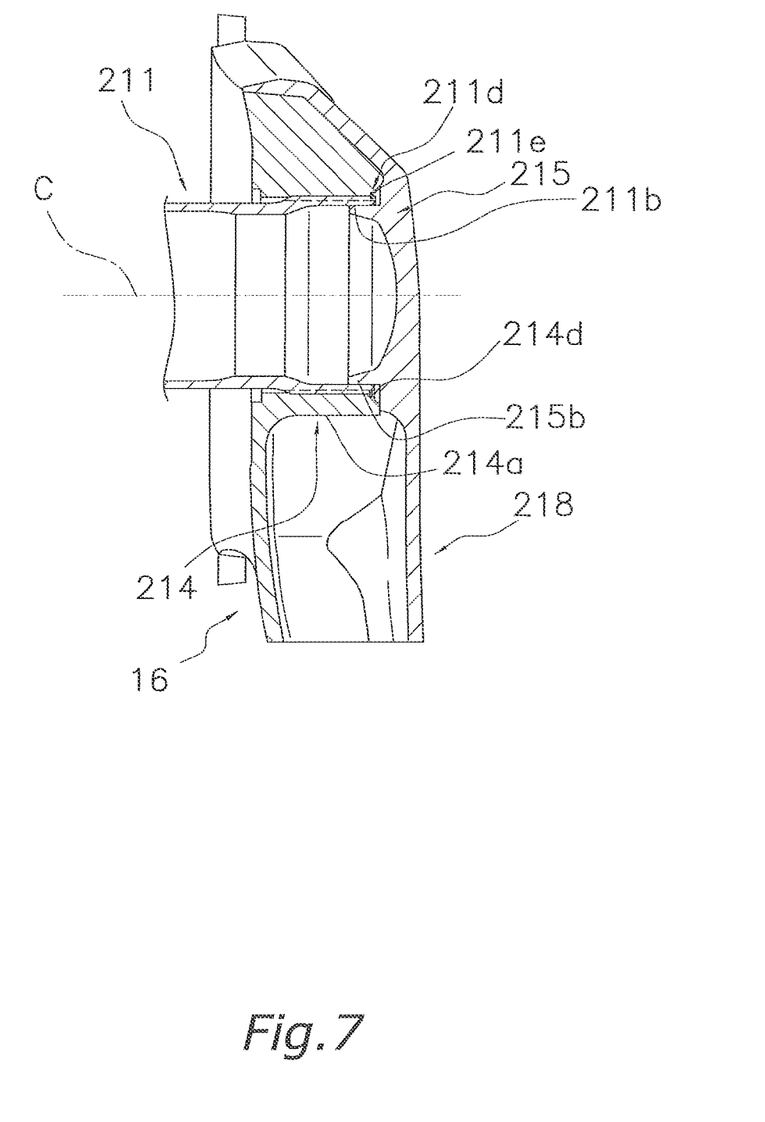
FIG. 7 is an enlarged cross sectional view corresponding to FIG. 5, of a portion of the bicycle crank assembly where the crank axle is fixed in accordance with a third embodiment.

Referring now to FIG. 7, a bicycle crank assembly is illustrated in accordance with a third embodiment, which comprises a hollow crank axle 211, a first crank axle supporting member 214, a second crank axle supporting member 215, the first crank part 16 of the first embodiment and a second crank part 218. Also the first and second crank parts 16 and 218 are joined together to form a crank main body and a plurality of sprocket mounting portions having the same configuration as in the first embodiment. The bicycle crank assembly of this third embodiment is identical to the bicycle crank assembly 10 of the first embodiment, except as explained below. While the second crank axle supporting member and the second crank part are separate pieces in the first and second embodiments, the second crank axle supporting member 215 and the second crank part 218 are formed as a one-piece integral unit as shown in FIG. 7 in the third embodiment. The second crank axle supporting member 215 has a cylindrical portion 215b that is fixed to the internal mounting surface 211b of the crank axle 211 with, for example, an adhesive.

The crank axle 211 is provided with a projection 211d, which serves to prevent the first crank part 16 from radially outwardly moving relative to the crank axle 211 in a radial direction of the crank axle 211. The projection 211d is formed by a retaining ring 211e that is installed onto the crank axle 211. The retaining ring 211e is a C or E-shaped retaining ring installed in an annular groove formed in an external circumferential surface of the crank axle 211. The first crank axle supporting member 214 is configured to be the same as in the first embodiment, except that the first crank axle supporting member 214 includes an abutment portion 214*d* that is formed in an end portion of the internal circumferential surface of the cylindrical portion 214*a* and configured such that the retaining ring 211*e* can contact the abutment portion 214*d*. The first crank part 16 can be prevented from axially outwardly moving by the retaining ring 211*e* contacting a stepped portion of the abutment portion 214*d*. Otherwise, the constituent features are the same as in the first embodiment.

Figure 8:
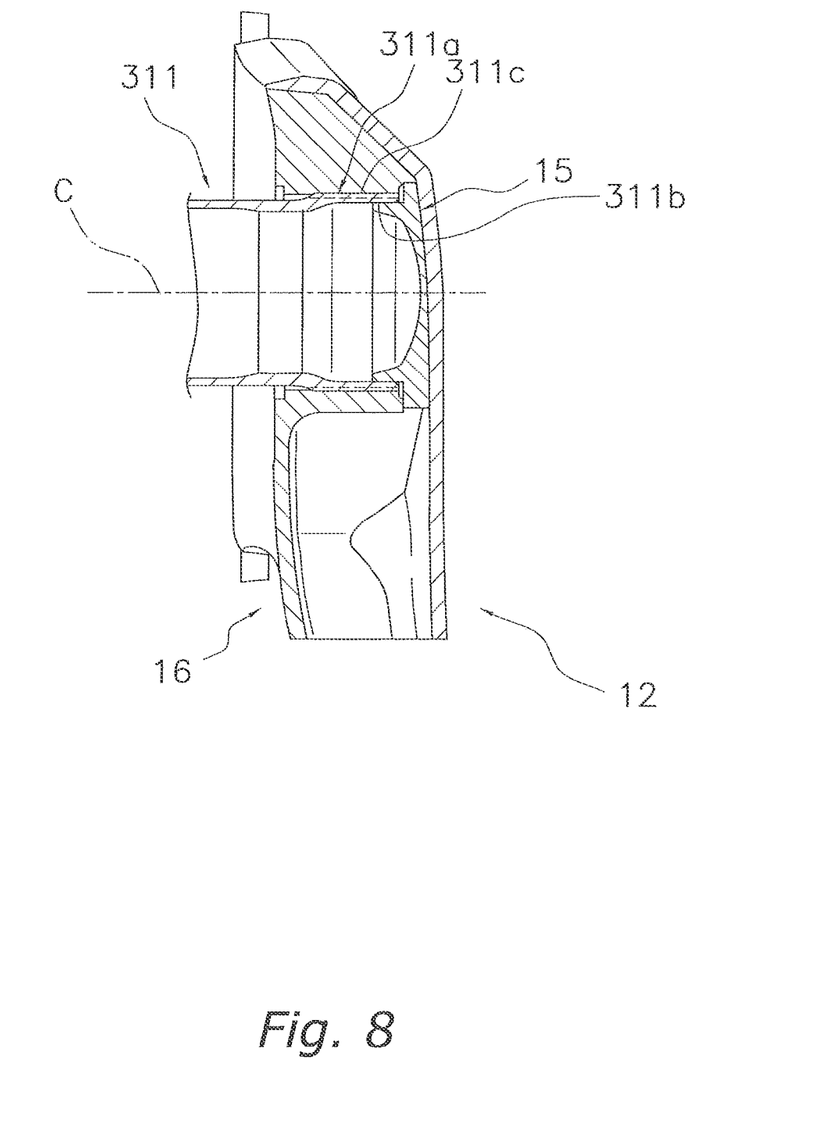
FIG. 8 is an enlarged cross sectional view, corresponding to FIG. 5, of a portion of the bicycle crank assembly where the crank axle is fixed in accordance with another embodiment.

Referring now to FIG. 8, the connection between the crank main body 12 and a crank axle 311 has been modified. Although in the first to third embodiments the crank axle is fixed to the crank main body 12 by press fitting, it is acceptable to fix the crank axle 311 and the crank main body 12 together with an adhesive as shown in FIG. 8. The crank axle 311 has an external mounting surface 311*a* and an internal mounting surface 311*b* similarly to the first to third embodiments. However, the external mounting surface 311*a* does not have a projection. Consequently, the crank axle 311 is inserted into the cylindrical portion 14*a* from the external mounting surface 311*a* side and fixed to the crank main body 12 by applying adhesive between the first splines 311*c* and the second splines 14*b*. Otherwise, the constituent features are the same as in the first embodiment.

In the previously explained embodiments, the sprocket mounting portions are provided on both the first crank part and the second crank part. However, it is acceptable to provide a sprocket mounting portion on only one or the other of the first and second parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank assembly comprising:
a crank axle having an external mounting surface and an internal mounting surface provided at one end of the crank axle;
a first outer shell member;
a second outer shell member that is fixed to the first outer shell member, and arranged relative to the first outer shell member with a space being formed between the first and second outer shell members;
a first crank axle supporting member fixed to the first outer shell member and supporting the external mounting surface of the crank axle; and
a second crank axle supporting member directly contacting and fixed to an axially inward facing surface of the second outer shell member and supporting the internal mounting surface of the crank axle.

2. The bicycle crank assembly as recited in claim 1, wherein
the external mounting surface of the crank axle has a plurality of first splines; and
the first crank axle supporting member has a plurality of second splines that engage with the first splines.

3. The bicycle crank assembly as recited in claim 2, wherein
the first splines of the crank axle protrude radially outward with respect to an external surface of an intermediate portion of the crank axle.

4. The bicycle crank assembly as recited in claim 3, wherein
the crank axle has a projection positioned axially outwardly relative to the first splines to prevent the first outer shell member from moving axially outwardly relative to the crank axle.

5. The bicycle crank assembly as recited in claim 4, wherein
the projection is a flange formed integrally along a circumference of the crank axle.

6. The bicycle crank assembly as recited in claim 4, wherein
the projection is a pin passing through the crank axle in a radial direction of the crank axle.

7. The bicycle crank assembly as recited in claim 4, wherein
the projection is a C-ring fitting onto the crank axle.

8. The bicycle crank assembly as recited in claim 1, wherein
the second crank axle supporting member is a separate piece from the second outer shell member.

9. The bicycle crank assembly as recited in claim 1, wherein
the first crank axle supporting member is a separate piece from the first outer shell member.

10. The bicycle crank assembly as recited in claim I. wherein
the second crank axle supporting member is integrally formed as a one-piece unit with the second outer shell member.

11. The bicycle crank assembly as recited in claim 1, wherein
the first outer shell member is fixed to the second outer shell member with an adhesive.

12. The bicycle crank assembly as recited in claim 1, wherein
the crank axle is fixed to the first crank axle supporting member in a press-fit manner.

13. The bicycle crank assembly as recited in claim 1, wherein
the crank axle is fixed to the first crank axle supporting member with an adhesive.

14. The bicycle crank assembly as recited in claim 1, wherein
the crank axle is fixed to the second crank axle supporting member in a press-fit manner 15. The bicycle crank assembly as recited in claim 1, wherein
the crank axle is fixed to the second crank axle supporting member with an adhesive.

16. The bicycle crank assembly as recited in claim 1, wherein
the second outer shell member is made of a fiber reinforced resin.

17. The bicycle crank assembly as recited in claim 1 wherein
the crank axle is hollow 18. A bicycle crank assembly comprising:
a crank axle having an external mounting surface and an internal mounting surface provided at one end of the crank axle;
a first outer shell member;
a second outer shell member arranged relative to the first outer shell member with a space being formed between the first and second outer shell members;
a first crank axle supporting member disposed on the first outer shell member and supporting the external mounting surface of the crank axle: and
a second crank axle supporting member directly contacting an axially inward facing surface of the second outer shell member and supporting the internal mounting surface of the crank axle,
the first crank axle supporting member being integrally formed as a one-piece unit with the first outer shell member.

19. A bicycle crank assembly comprising:
a crank axle having an external mounting surface and an internal mounting surface provided at one end of the crank axle;
a first outer shell member;
a second outer shell member arranged relative to the first outer shell member with a space being formed between the first and second outer shell members;
a first crank axle supporting member disposed on the first outer shell member and supporting the external mounting surface of the crank axle; and
a second crank axle supporting member directly contacting an axially inward facing surface of the second outer shell member and supporting the internal mounting surface of the crank axle, the second crank axle supporting member being a separate piece from the second outer shell member and including a flange portion that is fixed to the second outer shell member, and a cylindrical portion that supports the internal mounting surface of the crank axle.

20. The bicycle crank assembly as recited in claim 19, wherein the flange portion is fixed to the second outer shell member with an adhesive.

21. A bicycle crank assembly comprising:
a crank axle having an external mounting surface and an internal mounting surface provided at one end of the crank axle;
a first outer shell member;
a second outer shell member arranged relative to the first outer shell member with a space being formed between the first and second outer shell members;
a first crank axle supporting member disposed on the first outer shell member and supporting the external mounting surface of the crank axle; and
a second crank axle supporting member directly contacting an axially inward facing surface of the second outer shell member and supporting the internal mounting surface of the crank axle, the second crank axle supporting member being made of resin and provided as a separate piece from the second outer shell member.

22. A bicycle crank assembly comprising:
a crank axle having an external mounting surface and an internal mounting surface provided at one end of the crank axle;
a first outer shell member;
a second outer shell member arranged relative to the first outer shell member with a space being formed between the first and second outer shell members;
a first crank axle supporting member disposed on the first outer shell member and supporting the external mounting surface of the crank axle: and
a second crank axle supporting member directly contacting an axially inward facing surface of the second outer shell member and supporting the internal mounting surface of the crank axle,
at least one of the first outer shell member and the second outer shell e ber having at least one sprocket mounting portion.

23. A bicycle crank assembly comprising:
a crank axle having an external mounting surface and an internal mounting surface provided at one end of the crank axle;
a first outer shell member;
a second outer shell member arranged relative to the first outer shell member and arranged relative to the first outer shell member with a space being formed between the first and second outer shell members;
a first crank axle supporting member disposed on the first outer shell member and supporting the external mounting surface of the crank axle; and
a second crank axle supporting member directly contacting an axially inward facing surface of the second outer shell member and supporting the internal mounting surface of the crank axle,
the first outer shell member being made of an aluminum alloy.

24. A bicycle crank assembly comprising:
a crank axle having an external mounting surface and an internal mounting surface provided at one end of the crank axle, the external mounting surface of the crank axle having a plurality of first splines;
a first outer shell member;
a second outer shell member arranged relative to the first outer shell member with a space being formed between the first and second outer shell members;
a first crank axle supporting member disposed on the first outer shell member and supporting the external mounting surface of the crank axle, the first crank. axle supporting member having a plurality of second splines that engage with the first splines; and
a second crank axle supporting member directly contacting axially inward facing surface of the second outer shell member and supporting the internal mounting surface of the crank axle,
the second outer shell member e of an aluminum alloy.

* * * * *